United States Patent
Mizes et al.

(10) Patent No.: US 7,547,903 B2
(45) Date of Patent: *Jun. 16, 2009

(54) TECHNIQUE TO REMOVE SENSING ARTIFACTS FROM A LINEAR ARRAY SENSOR

(75) Inventors: Howard A. Mizes, Pittsford, NY (US); Jack Lestrange, Macedon, NY (US); Martin Edward Hoover, Rochester, NY (US); Steven R. Moore, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/939,815

(22) Filed: Nov. 14, 2007

(65) Prior Publication Data

US 2009/0121162 A1    May 14, 2009

(51) Int. Cl.
*G01N 21/86* (2006.01)
*B41J 29/393* (2006.01)

(52) U.S. Cl. .................... 250/559.1; 347/19

(58) Field of Classification Search ........... 250/559.1; 347/19

See application file for complete search history.

(56) References Cited

U.S. PATENT DOCUMENTS

| 7,154,110 B2 | 12/2006 | Mizes et al. | |
| 2006/0071185 A1* | 4/2006 | Mizes et al. | 250/559.1 |
| 2007/0252861 A1* | 11/2007 | Wu et al. | 347/19 |

OTHER PUBLICATIONS

U.S. Appl. No. 11/410,798, filed Apr. 25, 2006, Klassen et al.

\* cited by examiner

*Primary Examiner*—Thanh X Luu
(74) *Attorney, Agent, or Firm*—Fay Sharpe LLP

(57) ABSTRACT

Disclosed is a method and system for calibrating an image capturing sensor. The method and system include generating a test pattern on an image receiving device and measuring one or more colorimetric properties of the test pattern with an image sensor. The disclosed method and system measure the test pattern with the image sensor located in two or more different cross-process positions to determine an independent uniformity profile for the image sensor and the image rendering process.

18 Claims, 14 Drawing Sheets

TECHNIQUE TO REMOVE SENSING ARTIFACTS FROM A LINEAR ARRAY SENSOR

BACKGROUND

Both xerographic printers and direct marking prints have the potential to produce streaky images. In xerographic printers, variations in the performance of the subsystems (exposure, charging, development, transfer, and fusing) across the process direction will lead to a development efficiency that is a function of cross-process position and consequently streaks. In direct marking printers, the drop size and direction can vary as a function of nozzle, also leading to streaks.

One approach to mitigate streaking is to sense the magnitude of the streaking and actuate a subsystem that compensates for the streaking. One approach to sensing the magnitude of the streaking is to put a linear array sensor inside the printer. The linear array sensor is focused on the image receiver in the printer, for example, a photoreceptor surface. In a direct marking printer this can be the image drum. The linear array can monitor the uniformity of a printed test pattern. The test pattern can consist of a series of strips of various colors and densities.

The sensor typically monitors the specular reflection off the substrate. When there is no toner or ink on the substrate, the light from the illuminator is specularly reflected into the sensor and the sensor response is large. When there is ink or toner on the substrate, the ink or toner scatters the light away from the sensor and the sensor response decreases. The more ink or toner on the surface, the smaller the sensor response is.

This disclosure provides a means for calibrating an image output sensor such as a linear array sensor.

INCORPORATION BY REFERENCE

U.S. patent application Ser. No. 11/410,798, filed Apr. 25, 2006 by R. Victor Klassen; entitled "METHOD FOR CORRECTING SCANNER NON-UNIFORMITY"; and U.S. Pat. No. 7,154,110, issued Dec. 26, 2006 to Mizes et al., entitled "SYSTEM AND METHODS FOR IMPROVING CALIBRATION OF A LINEAR ARRAY SENSOR."

BRIEF DESCRIPTION

In accordance with one aspect of this disclosure, a method of calibrating an image sensor as a function of a pixel index associated with the image sensor is disclosed. The method of calibrating the image sensor comprises generating a test pattern on an image output device; measuring one or more colorimetric properties associated with the test pattern with an image sensor located at a first position relative to the test pattern to produce a first data set wherein the image sensor is aligned with a first area of the test pattern associated with a first range of pixel indices; measuring the one or more colorimetric properties associated with the test pattern with the image sensor located at one or more additional positions relative to the test pattern to produce one or more respective data sets, wherein the image sensor is aligned with the respective areas of the test patterns associated with the respective range of pixel indices which partially overlap the previous range of pixel indices; and processing the first data set and one or more respective data sets to determine the calibration profile of the image sensor as a function of the pixel indices, wherein the first and respective other areas of the test pattern include a common area of the test pattern associated with the partial overlap of the first and respective range of pixels.

In accordance with another aspect of this disclosure, an image output system is disclosed. The image output system comprises an image output device; an image output sensor; and an image output controller operatively connected to the image output device and image output sensor, the image controller output system configured to perform a method of calibrating the image output sensor as a function of a pixel index associated with the image output sensor, the method comprising measuring one or more colorimetric properties associated with a test pattern with the image output sensor at a first location relative to the test pattern and producing a first data set, wherein the image sensor is aligned with a first area of the test pattern associated with a first range of pixel indices; measuring one or more calorimetric properties associated with the test pattern with the image sensor located at one or more additional locations relative to the test pattern and producing one or more respective data sets, wherein the image sensor is aligned with the respective area of the test pattern associated with the respective range of pixel indices which partially overlap the previous range of pixel indices; and processing the first data set and one or more respective data sets to determine the calibration profile of the image sensor as a function of the pixel indices, wherein the first and respective areas of the test pattern include a common area of the test pattern associated with the partial overlap of the first and respective range of pixels.

DETAILED DESCRIPTION

As briefly discussed in the Background section of this disclosure, one approach to mitigating streaking is to sense the magnitude of the streaking with the use of a linear array sensor. The linear array sensor may be integrated within the printer or external to the printing device. In operation, the linear array sensor is focused on the image receiver such as a photoreceptor belt, photoreceptor drum or substrate. The purpose of the linear array sensor is to monitor the uniformity of ink or toner on the image receiver.

One system and method of providing a linear array sensor to measure the uniformity of print density associated with a printer is disclosed in U.S. Pat. No. 7,154,110, issued to Mizes et al. on Dec. 26, 2006.

To provide an accurate sensor response, a calibration must be performed on the linear array sensor. Each pixel in the sensor has a different gain and offset that must be calibrated out. This is typically done by capturing a dark image and monitoring a white calibration strip and these techniques are well known in the field. Moreover, unlike paper, an internal substrate typically has a two dimensional structure that is confounded with the amount of ink or toner on the surface. For example, the response of the sensor to a given mass of toner on a dark area of a substrate will be less than the response of the sensor to the same mass of toner on a light area of the substrate. This surface dependence can be calibrated out with a two pass image, where an image is captured of the same area before and after toner or ink is deposited on the surface. In addition, variations in the illumination between captures can contribute to sensor non-uniformity. This can be compensated by monitoring a bare area of the drum adjacent to the deposited ink in both the image before ink deposition and the image after ink deposition. The difference in the uniformity between these two images is used to further calibrate the sensor nonuniformity.

The calibration techniques discussed above assume that the fractional decrease in specularly reflected light from the same amount of toner is independent of sensor pixel. However, under some conditions this assumption does not hold.

Figure 1A:
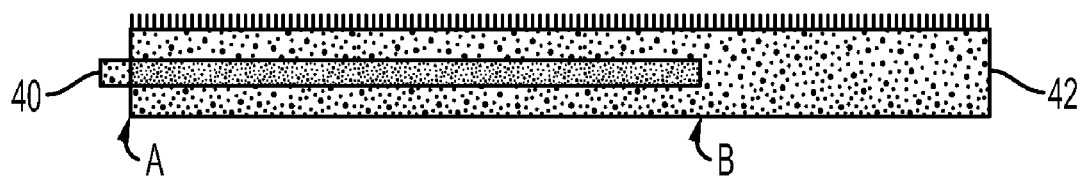
FIGS. 1A and 1B are an illustration of a linear array sensor located in a front position and rear position, respectively, according to an exemplary embodiment of this disclosure.
Figure 1B:
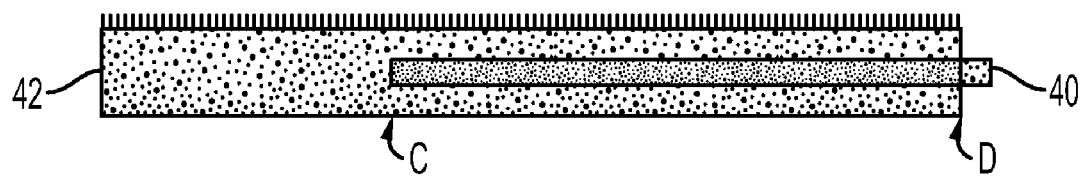
Figure 2:
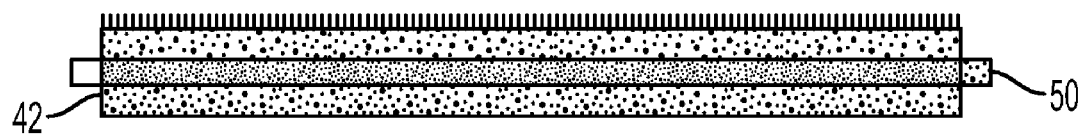
FIG. 2 is an illustration of another linear array sensor according to an exemplary embodiment of this disclosure.

For example, a direct marking printer may have a 12" process width and the linear array sensor in the direct marking printer may have an 8.5" width. In order to monitor the full process width, the linear array sensor must be designed to move across the image. At least two images must be taken to monitor the full uniformity, one where the sensor is moved to the left side of the image (front position) and one where the sensor is moved to the right side of the image (rear position). A test pattern strip 42 with the linear array sensor 40 in the front position is illustrated in FIG. 1A, and the test pattern strip 42 with the linear array sensor 40 in the rear position is illustrated in FIG. 1B. For comparison, the test pattern strip 42 with a full width linear array sensor 50 is shown in FIG. 2.

Figure 3A:
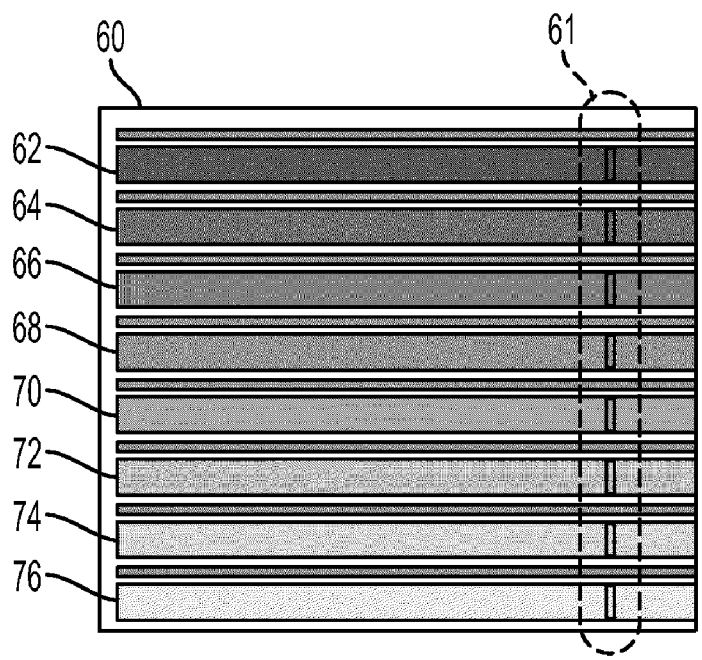
FIGS. 3A and 3B are illustrations of test pattern strips captured in the front position and the rear position, respectively, according to an exemplary embodiment of this disclosure.
Figure 3B:
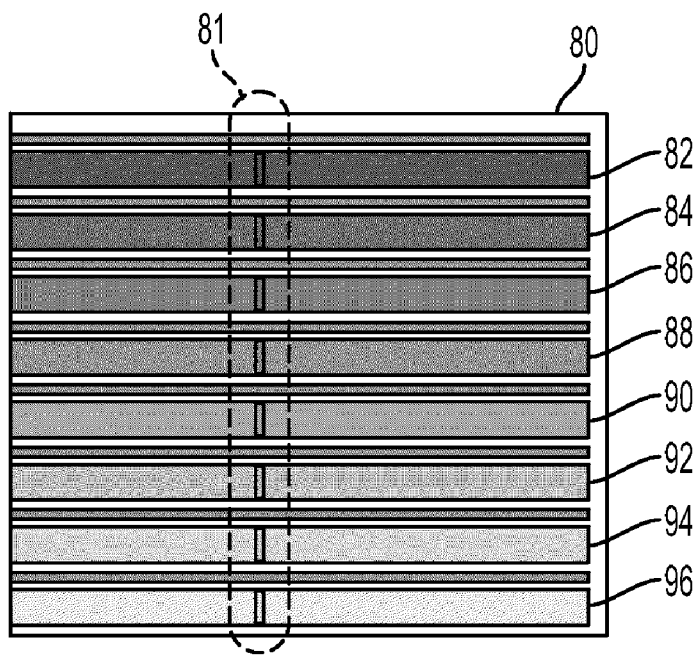

FIGS. 3A and 3B show an image of the calibrated uniformity test pattern. FIG. 3A shows the captured test pattern 60 where the linear array sensor 40 is in the front position and FIG. 3B shows the captured test pattern image 80 where the linear array sensor 40 is in the rear position. The images, 60 and 80, are of a series of 8 black strips that range in density from a 12.5% area coverage to 100% area coverage. Captured image 60 includes black strips 62, 64, 66, 68, 70, 72, 74 and 76 which correspond to the captured images of a test pattern series of black strips at respective densities of 100%, 87.5%, 75%, 67.5%, 50% 37.5%, 25% and 12.5%, where the captured images are acquired with the linear array sensor in the front position as illustrated in FIG. 1A.

Captured image 80 includes black strips 82, 84, 86, 88, 90, 92, 94 and 96 which correspond to the captured image of the test pattern series of black strips at respective densities of 100%, 87.5%, 75%, 67.5%, 50%, 37.5%, 25% and 12.5%, where the captured images are acquired with the linear array sensor in the rear position as illustrated in FIG. 1B.

Notably, captured image 60 includes a streak 61 and captured image 80 includes a streak 81. These captured image streaks correspond to a common streak associated with the printing of the test pattern series of black strips. Because the linear array sensor 40 is capturing an image of the test pattern series in a front and back position, the streak is captured at two different positions relative to the linear array sensor 40.

Figure 4:
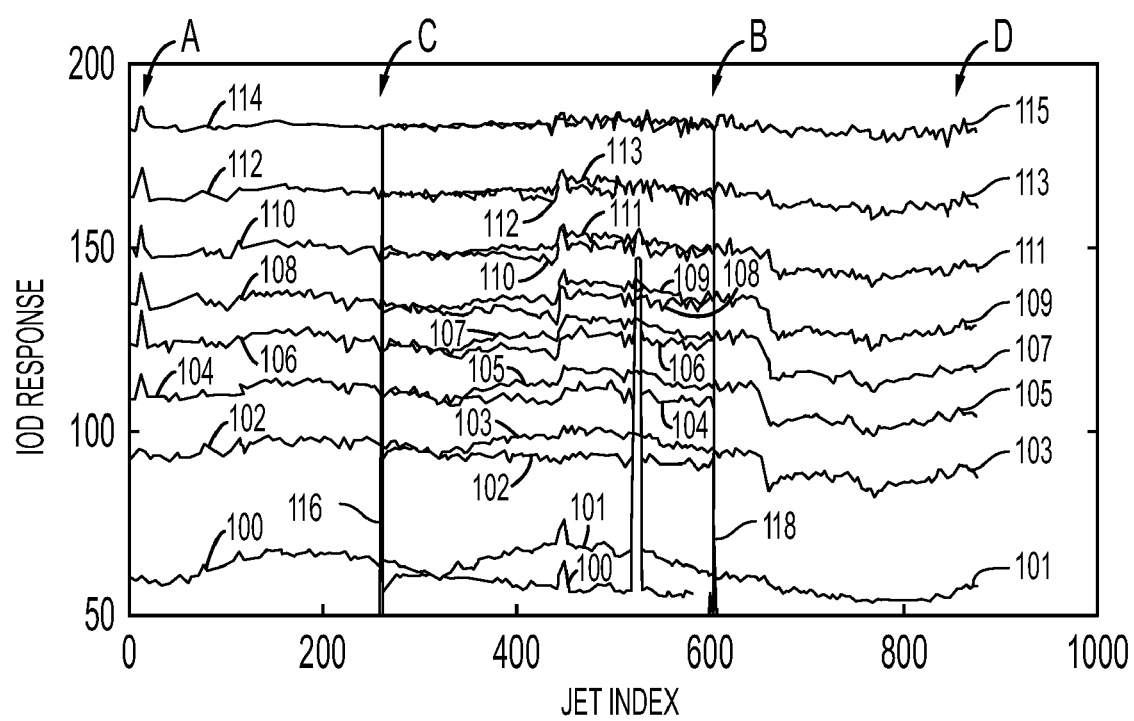
FIG. 4 is an illustration of the estimated profiles associated with the captured test patterns illustrated in FIGS. 3A and 3B.

FIG. 4 shows the result of image processing that gives the uniformity profile of each strip. Uniformity profiles 100 and 101 correspond to captured image strip images 62 and 82, respectively. The illustrated uniformity profiles 100 and 101 extend from a low jet index value to a high jet index value corresponding to the cumulative span of the linear array sensor 40 from the front position illustrated in FIG. 3A to the rear position illustrated in FIG. 3B. Reference characters A and B identify the span of the captured image corresponding to the linear array sensor located at the front position as illustrated in FIG. 3A and reference characters C and D identify the span of the captured image corresponding to the linear array sensor located at the rear position as illustrated in FIG. 3B. The vertical axis of the uniformity profiles illustrated in FIG. 4 correspond to the response of the linear array sensor to the IOD (Image on Drum). A bare drum produces an "IOD response" of 200, where coverage of the drum with ink reduces the "IOD response."

The uniformity profile graphs illustrated in FIG. 4 provide a quantification of the performance of a linear array sensor in tandem with a printer. In other words, the uniformity profiles, i.e. 100, 115, illustrate the uniformity of a series of printed calibration strips as measured with a linear array sensor which can be characterized as having a signature which affects the measured uniformity profile. To further illustrate, a detailed explanation of the IOD response graph is now provided. The IOD response graph includes the following uniformity profile graphs:

Linear array response 100 represents the response of a linear array sensor to a printed strip of a first print density, where the linear array sensor is located at a front position relative to the drum substrate;

Linear array response 102 represents the response of the linear array sensor to a printed strip of a second print density, where the linear array sensor is located at the front position relative to the drum substrate and the second print density is less than the first print density associated with linear array response 100;

Linear array response 104 represents the response of the linear array sensor to a printed strip of a third print density, where the linear array sensor is located at the front position relative to the drum substrate and the third print density is less than the second print density associated with linear array response 102;

Linear array response 106 represents the response of the linear array sensor to a printed strip of a fourth print density where the linear array sensor is located at the front position relative to the drum substrate and the fourth print density is less than the third print density associated with linear array response 104;

Linear array response 108 represents the response of the linear array sensor to a printed strip of a fifth print density, where the linear array sensor is located at the front position relative to the drum substrate and the fifth print density is less than the fourth print density associated with linear array response 106;

Linear array response 110 represents the response of the linear array sensor to a printed strip of a sixth print density, where the linear array sensor is located at the front position relative to the drum substrate and the sixth print density is less than the fifth print density associated with linear array response 108;

Linear array response 112 represents the response of the linear array sensor to a printed strip of a seventh print density, where the linear array sensor is located at the front position relative to the drum substrate and the seventh print density is less than the sixth print density associated with linear array response 110;

Linear array response 114 represents the response of the linear array sensor to a printed strip of an eighth print density, where the linear array sensor is located at the front position relative to the drum substrate and the eighth print density is less than the seventh print density associated with linear array response 112; and Linear array responses 101, 103, 105, 107, 109, 111, 113 and 115 represent the responses of the linear array sensor to the printed strips associated with linear array responses 100, 102, 104, 106, 108, 110, 112 and 114, respectively, where the linear array sensor is located at the rear position relative to the drum substrate.

Reference characters 116 and 118 identify those areas of the uniformity profile graph which correspond to edges of the linear array sensor. Edge 118 corresponds to the linear array sensor back edge with the linear array sensor in the front position. Edge 116 corresponds to the linear array sensor front edge with the linear array sensor in the rear position.

Notably, the uniformity profiles associated with the linear array sensor located in the front position (i.e. 100, 102, 104, 106, 108, 110, 112 and 114) do not overlap with the uniformity profiles associated with the linear array sensor located in the rear position (i.e. 101, 103, 105, 107, 109, 111, 113 and 115). This area is illustrated on the graph between C and D, which corresponds to the area of the drum substrate which is measured by the linear array sensor at two different locations which overlap, i.e. the front and rear positions. The IOD responses indicate nonuniformities associated with the linear array sensor contributing to the measured uniformity profile measured for each calibration strip.

For example, linear array response 101 is greater than linear array response 100 within the overlap area between B and C. In other words, the linear array sensor is indicating more detected light with the linear array sensor in the rear position, relative to the linear array sensor located in the front position at the same strip position. This difference in response of the linear array sensor can only be attributable to the signature characteristics of the linear array sensor because the linear array sensor responses are measuring the print density associated with an area of the strip which is constant for the linear array front and rear position measurements.

Another observation about the uniformity profile graphs illustrated in FIG. 4 is the linear array signature effects are print density dependent. For example, the linear array signature effects are greater for a strip of greater print density such as linear array response 100 and 101, as compared to linear array response 114 and 115. In other words, as the print density of the calibration strip decreases, the linear array sensor response for the front and rear positions becomes more and more likely to overlap as illustrated for linear array sensor response 114 and 115.

Figure 5:
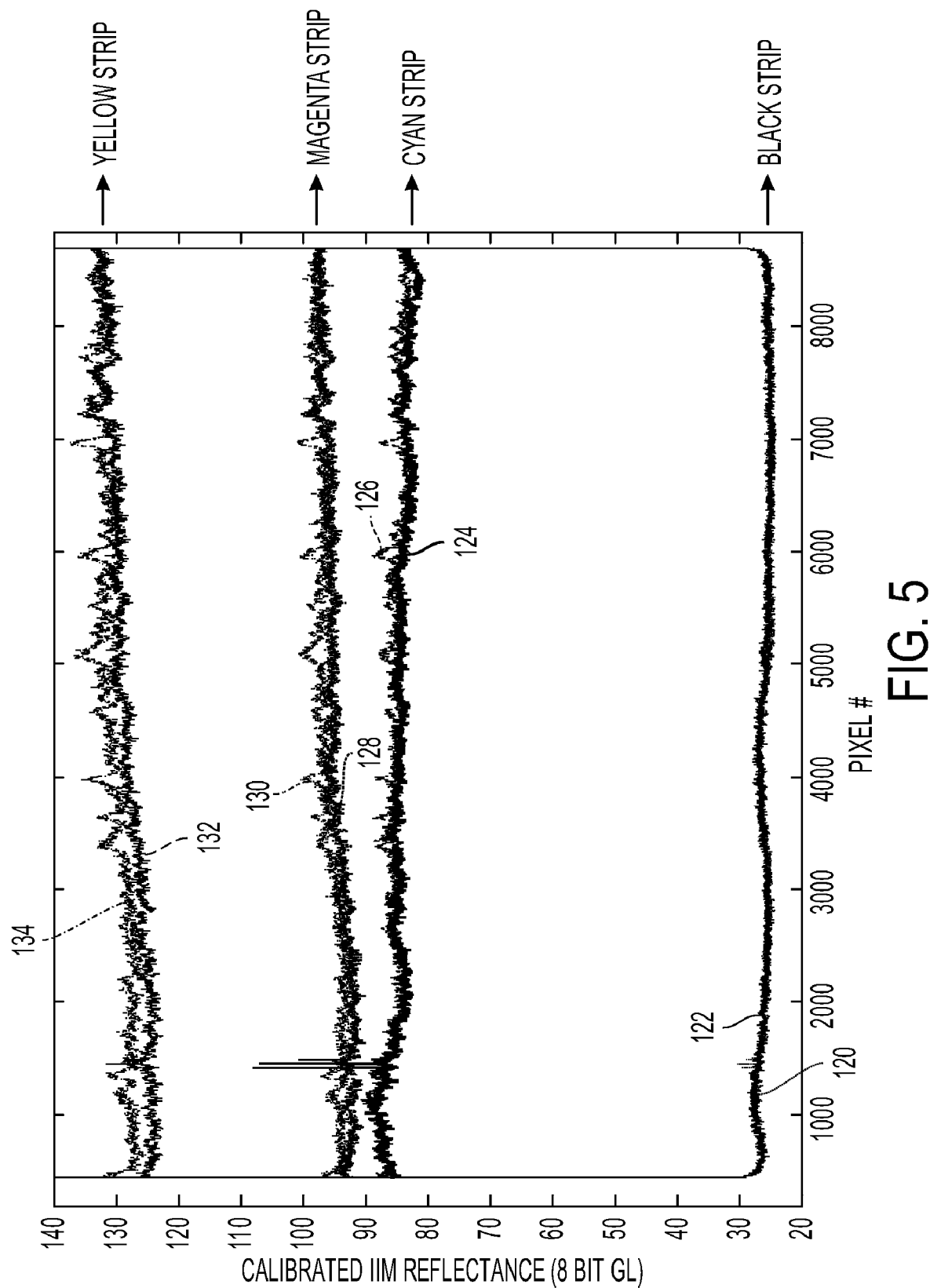
FIG. 5 illustrates two image sensor signature reflection profiles, for a black strip, a cyan strip, a magenta strip, and a yellow strip according to an exemplary embodiment of this disclosure.

With reference to FIG. 5, illustrated is another example of a measure uniformity profile for a series of calibration strips, where the effects of the linear array sensor are apparent.

FIG. 5 plots the uniformity of a black strip, a cyan strip, a magenta strip and a yellow strip across the full process width of a printer. The same uniformity strips (i.e. the black strip, cyan strip, magenta strip and yellow strip) were imaged with two different linear array sensors. Uniformity profiles 120, 124, 128 and 132 correspond to a first linear array image sensor and uniformity profiles 122, 126, 130 and 134 correspond to a second linear array image sensor. By looking at the plots, it is observable that a noisier profile is imaged by the second linear array image sensor and the structure of the noise is the same from strip to strip. The structure of the noise is due to the large sensor signature present for the second linear array image sensor which is mostly absent from the first linear array image sensor.

Figure 6:
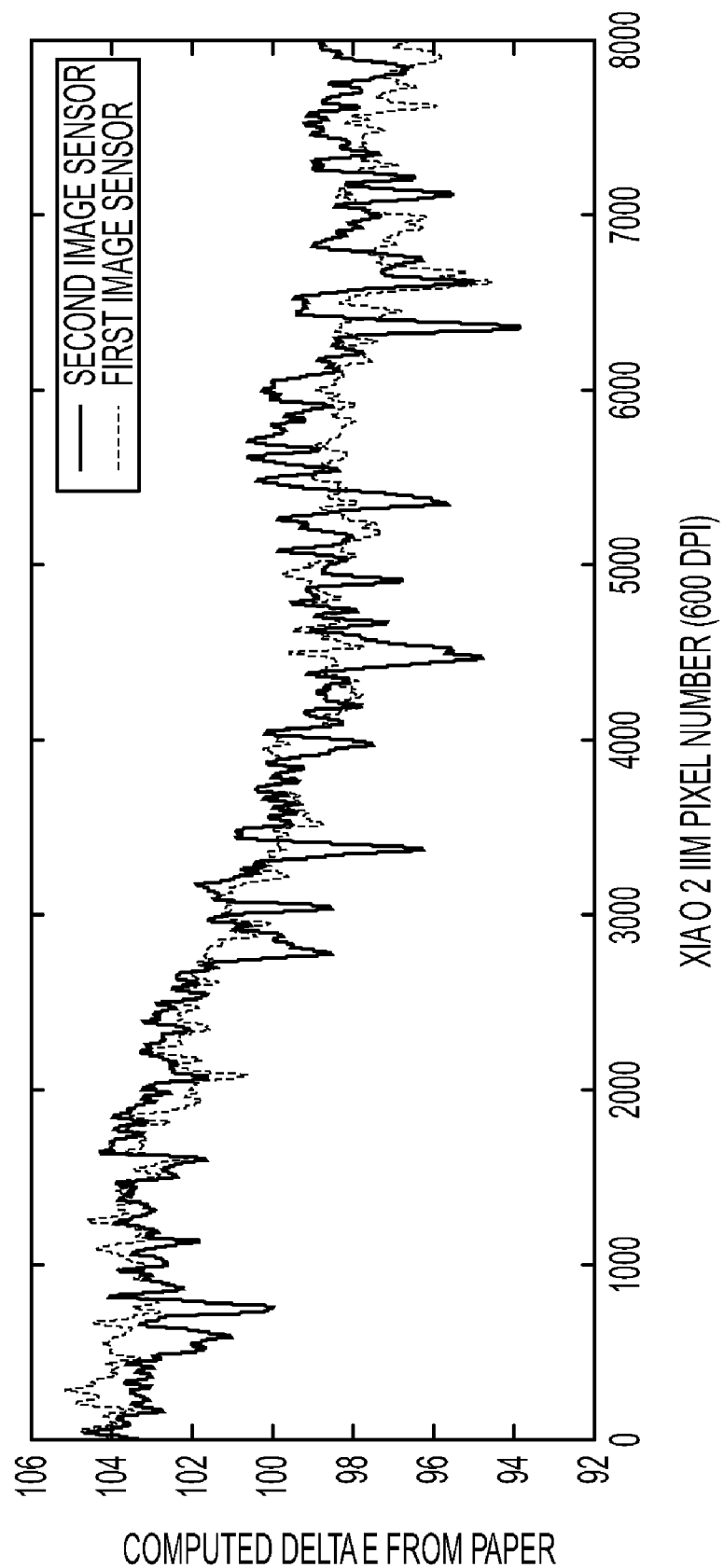
FIG. 6 is a plot of the DeltaE for the two image sensor profiles plotted in FIG. 5, as related to the measurement of the yellow strip.

FIG. 6 illustrates the DeltaE associated with the first and second image sensors.

Discussed heretofore, this disclosure has provided an analysis of the affects of the physical characteristics of a linear array sensor as related to the uniformity profile measurements of various print density calibration strips. The discussion which immediately follows is directed to quantify the signature of a linear array sensor, where the quantified signature is derived from measuring the spectral reflectance of a test pattern with a linear array sensor at two or more positions. This sensor signature characterization is then used to more accurately generate a uniformity profile associated with a printed strip, where the contribution of the sensor signature is removed from the measured response. The relatively improved print density uniformity profile enables relatively better detection and compensation of streaks.

To determine a sensor signature, one assumes that the profile measured with the IOD is a sum of the true profile plus a signature term. Expressing the relationship is complicated slightly because the captured profile is most conveniently expressed as a function of the position along the uniformity strip, while the sensor signature is most conveniently expressed as a function of the pixel index of the linear array. These two quantities are related by fiducials in the test pattern.

Figure 7A:
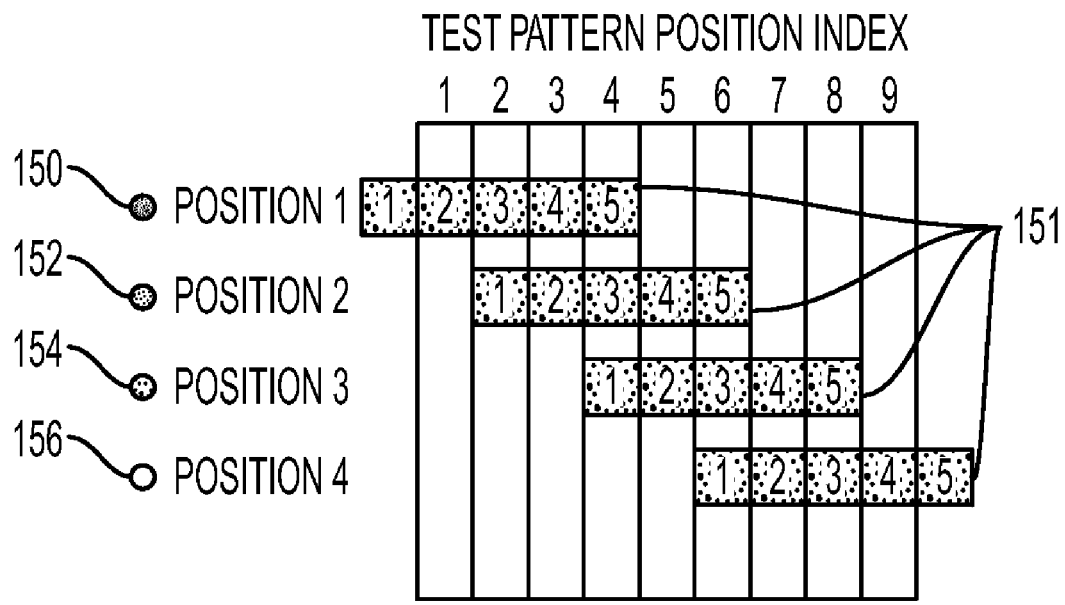
FIGS. 7A and 7B are illustrations of a series of indexed linear array positions relative to a yellow test pattern, and a plot of the linear array response, respectively, according to an exemplary embodiment of this disclosure.
Figure 7B:
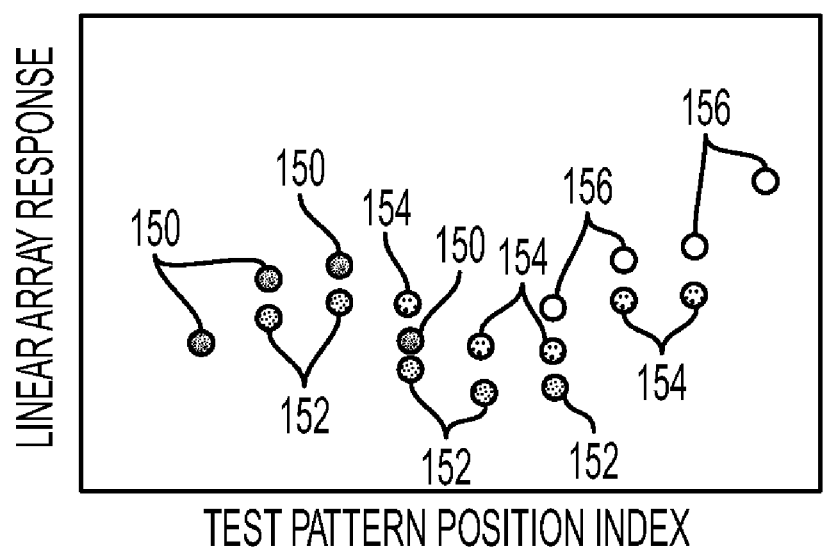

With reference to FIGS. 7A and 7B, illustrated is an example of the separate contributions of the sensor and the profile to the response of the linear array. FIG. 7A, shows the 9 positions of the uniformity test pattern and the 4 positions, i.e. 150, 152, 154 and 156, of the 5 pixel wide linear array 151 that is reading the pattern. FIG. 7B shows a schematic response of the sensor. Each differently shaded dot corresponds to a different linear array position where 150, 152, 154 and 156 represent different shadings/linear array sensors. If there were no sensor signature, the dots would overlap.

For this illustration, there are 9 independent positions, the true calibrated response of the substrate is $p(j)$, $j=1, 2, \ldots 9$ and the position of each position of the test pattern is $x(j)$, $j=1, 2, \ldots 9$.

In this illustration, the sensor is narrower that the width of the process. However, generally, the linear array can be either narrower or wider than the uniformity strip. The sensor signature is given by $s(i)$, $i=1, 2, \ldots, 5$ and is independent of sensor position.

The response of the sensor at each position is assumed to be given by the following equations:

Position 1 (dots 150)

$r_1(1) = p(1) + s(x(2)) = p(1) + s(2)$ $r_1(2) = p(2) + s(x(3)) = p(2) + s(3)$ $r_1(3) = p(3) + s(x(4)) = p(3) + s(4)$ $r_1(4) = p(4) + s(x(5)) = p(4) + s(5)$

Position 2 (dots 152)

$r_2(1) = p(2) + s(x(2)) = p(2) + s(1)$ $r_2(2) = p(3) + s(x(3)) = p(2) + s(2)$ $r_2(3) = p(4) + s(x(4)) = p(2) + s(3)$ $r_2(4) = p(5) + s(x(5)) = p(2) + s(4)$ $r_2(5) = p(6) + s(x(6)) = p(2) + s(5)$

Position 3 (dots 154)

$r_3(1) = p(4) + s(x(4)) = p(4) + s(1)$ $r_3(2) = p(5) + s(x(5)) = p(5) + s(2)$ $r_3(3) = p(6) + s(x(6)) = p(6) + s(3)$ $r_3(4) = p(7) + s(x(7)) = p(7) + s(4)$ $r_3(5) = p(8) + s(x(8)) = p(8) + s(5)$

Position 4 (dots 156)

$r_4(1) = p(6) + s(x(6)) = p(6) + s(1)$ $r_4(2) = p(7) + s(x(7)) = p(7) + s(2)$ $r_4(3) = p(8) + s(x(8)) = p(8) + s(3)$ $r_4(4) = p(9) + s(x(9)) = p(9) + s(4)$ (1)

In general, suppose that a uniformity strip has $N_j$ independent position. $N_j$ could correspond for example to each jet in a direct marking printhead, but in general it could refer to $N_j$ positions along the uniformity strip. $N_m$ are the number of different measurements made (4 in the above example). $N_s$ are the number of different positions that characterize the sensor signature. They could be the number of elements in the sensor, but they do not necessarily have to be so. None of the locations must necessarily be equally spaced. The general set of equations are given then by $$\begin{aligned}
r_1(1) &= p(1) + s(x_1(1)) & r_2(1) &= p(1) + s(x_2(1)) \\
r_1(2) &= p(2) + s(x_1(2)) & r_2(2) &= p(2) + s(x_2(2)) \\
&\vdots & &\vdots \\
r_1(N_j) &= p(N_j) + s(x_1(N_j)) & r_2(N_j) &= p(N_j) + s(x_2(N_j))
\end{aligned}$$

$$\begin{aligned}
r_{N_m}(1) &= p(1) + s(x_{N_m}(1)) \\
r_{N_m}(2) &= p(2) + s(x_{N_m}(2)) \\
&\vdots \\
r_{N_m}(N_j) &= p(N_j) + s(x_{N_m}(N_j))
\end{aligned}$$ (2)

For each set of equations for a particular linear array position i, only those jets in the field of view are added to this set of equations. For example, when the linear array is in the position 1 in the above example, only jets from 1 up to the last jet in the field of view are considered.

The set of equations (1) can be recast as a matrix equation. Define the column vector $$R = [r_1(1), r_1(2), \ldots, r_1(N_j), r_2(1), r_2(2), \ldots, r_2(N_j), rN_m(1), rN_m(2), \ldots, rN_m(N_j)]'$$ (3)

but include only the jets that are in the field of view of the sensor. For example, if the linear array in position 1 sees jets 1-4, in position 2 sees jets 2-6, and in position 3 sees jets 4-8, and in position 4 sees jets 6-9, then $R=[r_1(1), r_1(2), r_1(3), r_1(4), r_2(2), r_2(3), r_2(4), r_2(5), r_2(6), r_3(4), r_3(5), r_3(6), r_3(7), r_3(8), r_4(6), r_4(7), r_4(8), r_4(9)]'$.

Define another column vector $$B = [S, P]' = [s(1), s(2), \ldots, s(N_s), p(1), p(2), \ldots, p(N_j)]'$$ (4)

which is a concatenation of the sensor signature profile and the true uniformity strip profile. Then equation (2) can be expressed as the matrix equation, $MB=R$. For example, equation (1) can be expressed in matrix form as $$\begin{pmatrix} 0 & 1 & 0 & 0 & 0 & 1 & 0 & 0 & 0 & 0 & 0 & 0 & 0 \\ 0 & 0 & 1 & 0 & 0 & 0 & 1 & 0 & 0 & 0 & 0 & 0 & 0 \\ 0 & 0 & 0 & 1 & 0 & 0 & 0 & 1 & 0 & 0 & 0 & 0 & 0 \\ 0 & 0 & 0 & 0 & 1 & 0 & 0 & 0 & 1 & 0 & 0 & 0 & 0 \\ 1 & 0 & 0 & 0 & 0 & 0 & 1 & 0 & 0 & 0 & 0 & 0 & 0 \\ 0 & 1 & 0 & 0 & 0 & 0 & 0 & 1 & 0 & 0 & 0 & 0 & 0 \\ 0 & 0 & 1 & 0 & 0 & 0 & 0 & 0 & 1 & 0 & 0 & 0 & 0 \\ 0 & 0 & 0 & 1 & 0 & 0 & 0 & 0 & 0 & 1 & 0 & 0 & 0 \\ 0 & 0 & 0 & 0 & 1 & 0 & 0 & 0 & 0 & 0 & 1 & 0 & 0 \\ 1 & 0 & 0 & 0 & 0 & 0 & 0 & 1 & 0 & 0 & 0 & 0 & 0 \\ 0 & 1 & 0 & 0 & 0 & 0 & 0 & 0 & 1 & 0 & 0 & 0 & 0 \\ 0 & 0 & 1 & 0 & 0 & 0 & 0 & 0 & 0 & 1 & 0 & 0 & 0 \\ 0 & 0 & 0 & 1 & 0 & 0 & 0 & 0 & 0 & 0 & 1 & 0 & 0 \\ 0 & 0 & 0 & 0 & 1 & 0 & 0 & 0 & 0 & 0 & 0 & 1 & 0 \\ 1 & 0 & 0 & 0 & 0 & 0 & 0 & 0 & 0 & 1 & 0 & 0 & 0 \\ 0 & 1 & 0 & 0 & 0 & 0 & 0 & 0 & 0 & 0 & 1 & 0 & 0 \\ 0 & 0 & 1 & 0 & 0 & 0 & 0 & 0 & 0 & 0 & 0 & 1 & 0 \\ 0 & 0 & 0 & 1 & 0 & 0 & 0 & 0 & 0 & 0 & 0 & 0 & 1 \end{pmatrix} \begin{pmatrix} s(1) \\ s(2) \\ s(3) \\ s(4) \\ s(5) \\ p(1) \\ p(2) \\ p(3) \\ p(4) \\ p(5) \\ p(6) \\ p(7) \\ p(8) \\ p(9) \end{pmatrix} = \begin{pmatrix} r_1(1) \\ r_1(2) \\ r_1(3) \\ r_1(4) \\ r_2(1) \\ r_2(2) \\ r_2(3) \\ r_2(4) \\ r_2(5) \\ r_3(1) \\ r_3(2) \\ r_3(3) \\ r_3(4) \\ r_3(5) \\ r_4(2) \\ r_4(3) \\ r_4(4) \\ r_4(5) \end{pmatrix}$$ (6)

In general, the matrix M does not necessarily have to be a square matrix. The number of columns is equal to $N_s + N_j$. The number of rows is equal to the sum of the independent uniformity strip positions measured for each linear array position. In the above example, the number of columns is equal to 5+9=14 and the number of rows is equal to 4+5+5+4=18. For realistic systems the matrix can have hundreds or thousands of rows and columns.

Both the sensor signature and the strip profile are determined by multiplying both sides of equation (6) by the inverse of the matrix M resulting in the equation $$B = M^{-1}R \qquad (7)$$

Calculating the inverse of the sparse matrix with millions of elements can be quite time consuming, but this inversion can be performed before the incorporation in the algorithm. For each measurement, only the matrix R needs to be determined, which is the series of profiles measured. Performing a linear combination of these profiles governed by $M^{-1}$ will give both the sensor signature and the strip profile.

Figure 8:
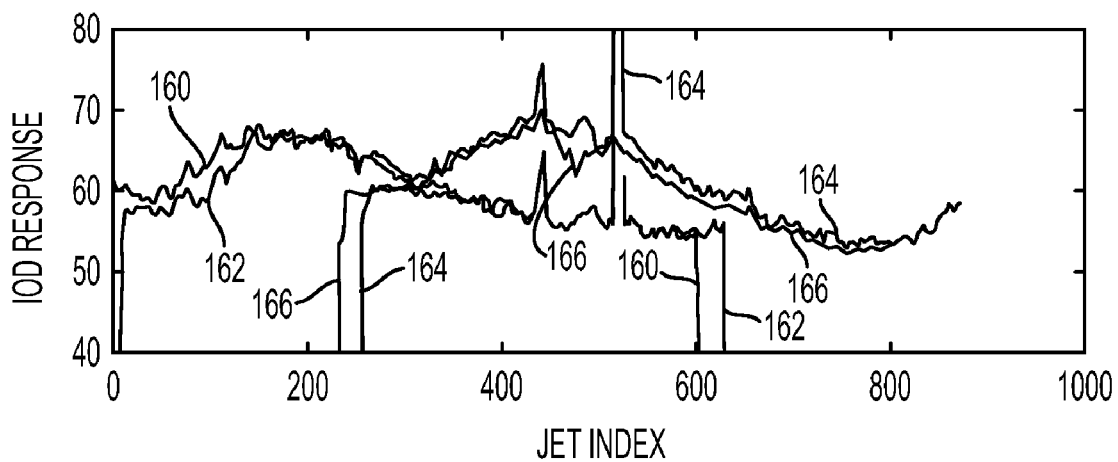
FIG. 8 illustrates an IOD (Image on Drum) response relative to the jet index of a direct marking printer according to an exemplary embodiment of this disclosure for four different positions of the IOD.

The concepts discussed above have been reduced to practice on an experimental fixture. FIG. 8 shows a series of four profiles that were derived from experimental measurements of a 100% yellow strip. Line 160 shows an experimental profile with the sensor in the front position. Line 162 shows an experimental profile with the sensor displaced 10 mm from the front position towards the center. Line 164 shows an experimental profile with the sensor in the rear position. Line 166 shows an experimental profile with the sensor displaced 10 mm from the rear position towards the center. The profiles do not overlap because of the existence of the sensor signature, which causes the linear array response to increase in the center. This is seen most clearly by the wide bump in the centers of the front and rear positions. One can also see the sensor signature following the displacement of the sensor between the offset front and rear position while the underlying structure stays tied to each jet.

Figure 9:
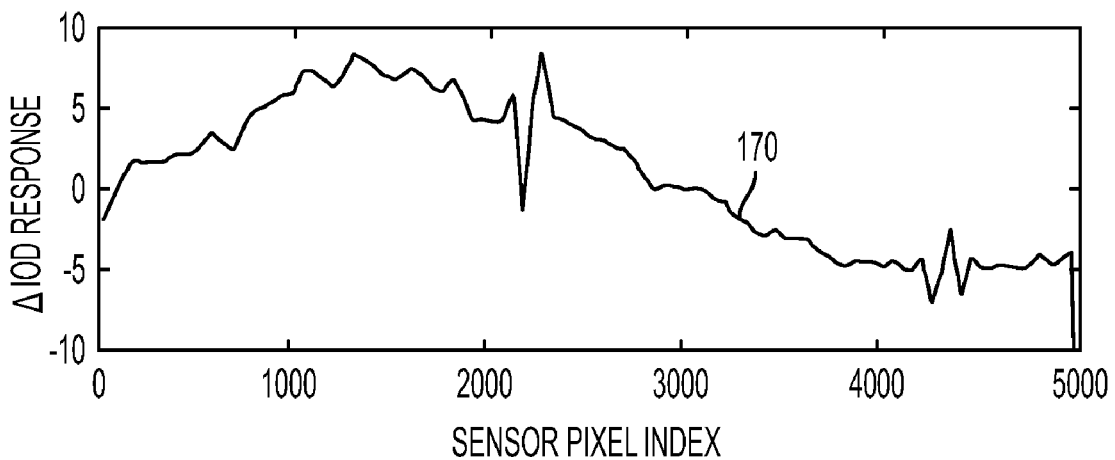
FIG. 9 illustrates the magnitude of a sensor signature as a function of a linear array pixel index for a 100% yellow strip according to an exemplary embodiment of this disclosure.

FIG. 9 plots the sensor signature 170 as a function of sensor pixel index obtained by solving the matrix equation (7) for the measured profiles. It shows the characteristic bulge effect expected. The jumps at linear array pixel index ~2200 and ~4300 are due to missing jets in the test pattern and should be absent for a better quality pattern.

Figure 10:
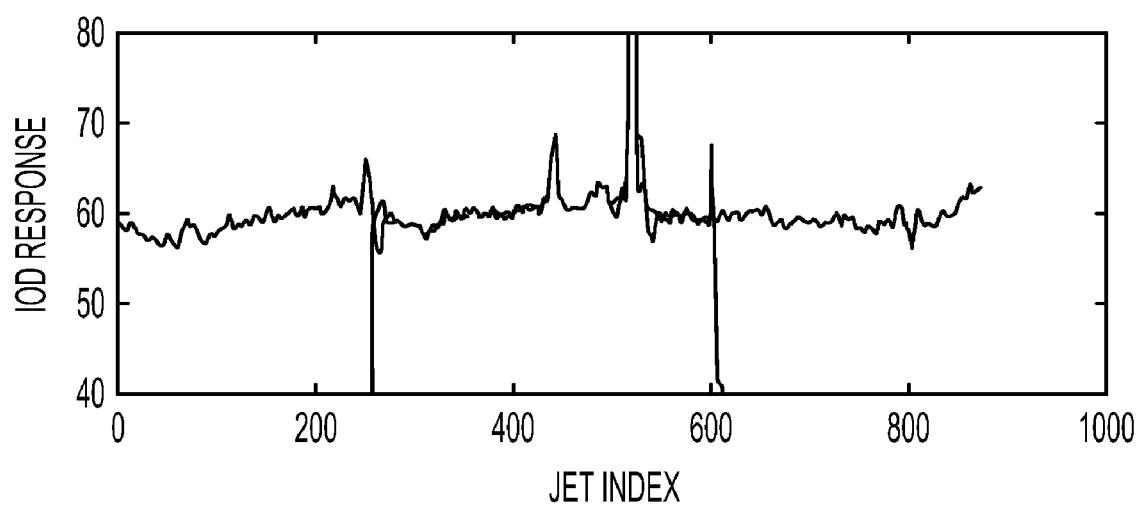
FIG. 10 illustrates the IOD response after the linear array sensor signature has been calibrated out, relative to the jet index position, according to an exemplary embodiment of this disclosure.
Figure 12:
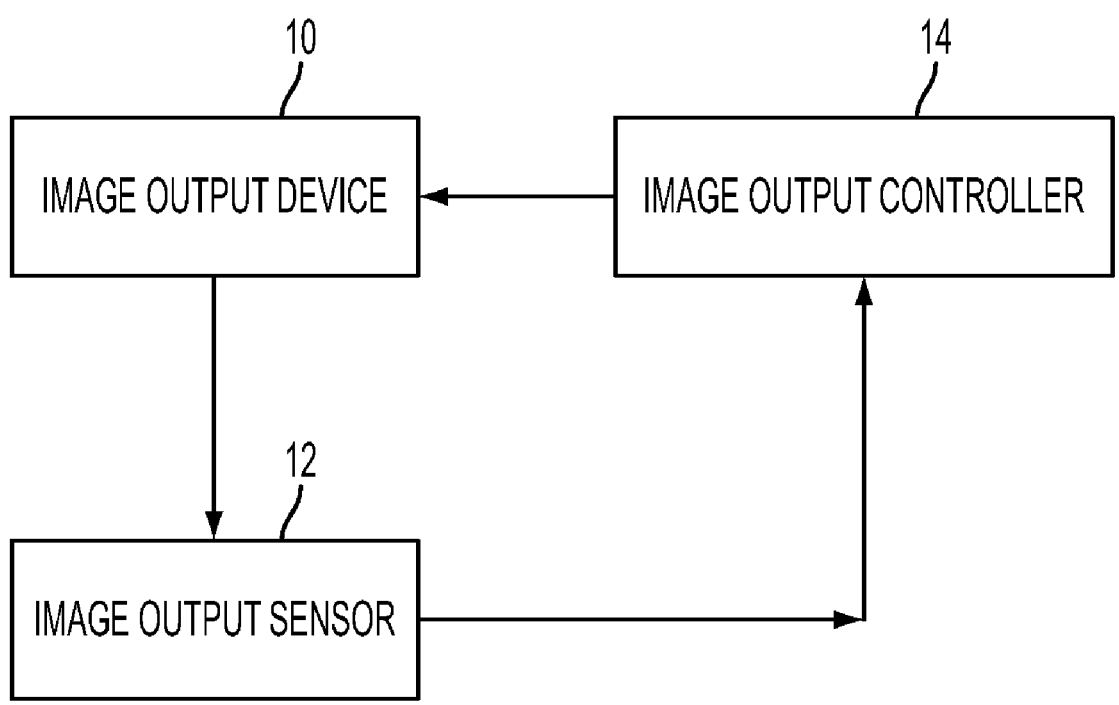
FIG. 12 is a block diagram of an image output system according to an exemplary embodiment of this disclosure.

If the profile of FIG. 9 is added to profiles 160 and 164 of FIG. 8, using the test pattern fiducials to determine which portion of the sensor imaged which portion of the test pattern, the calibrated profiles of FIG. 10 are obtained. FIG. 12 illustrates there is a much better overlap between the front and the rear position, indicating that the sensor signature has been calibrated out.

Figure 11:
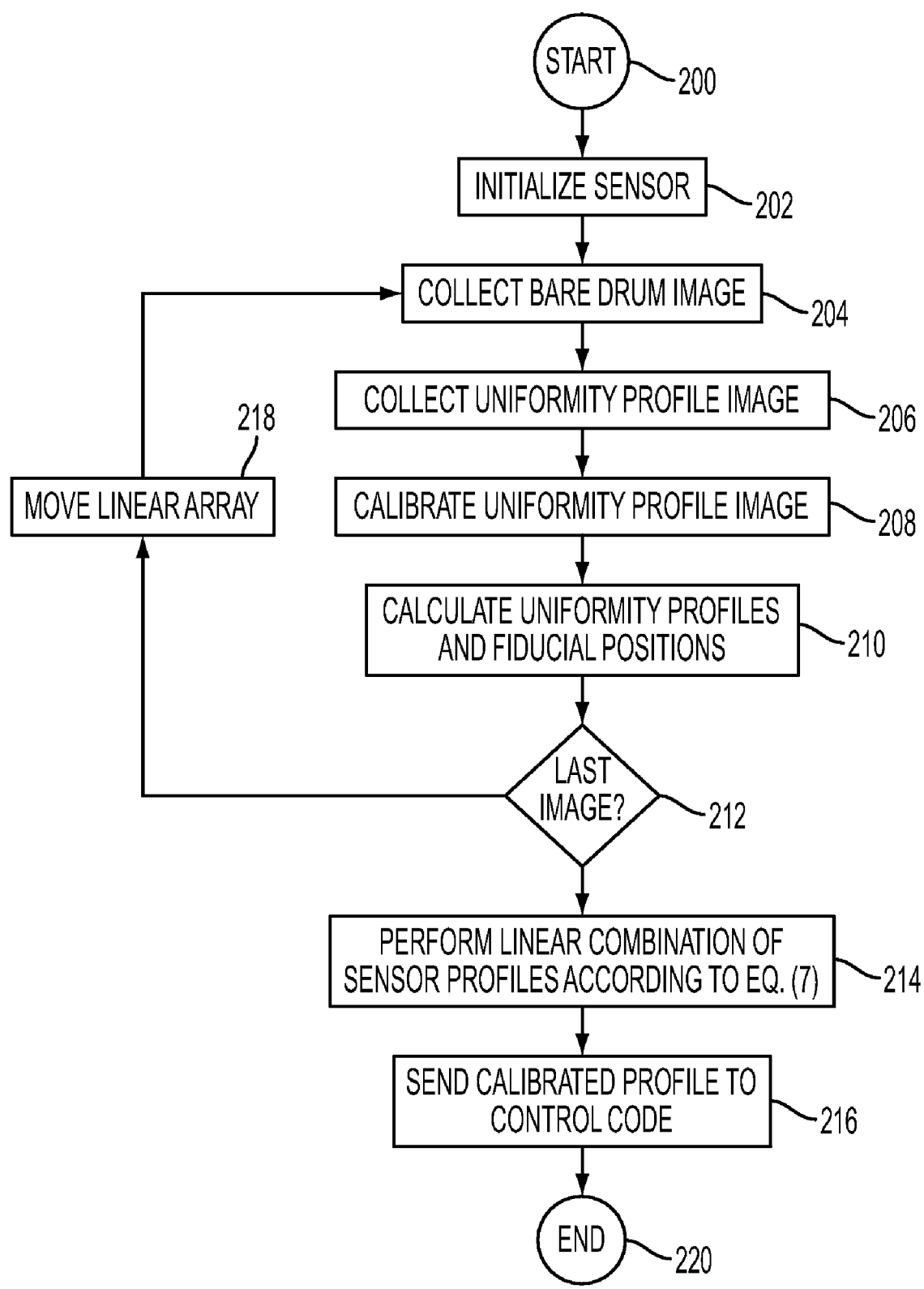
FIG. 11 is a flow chart illustrating a method of applying the image sensor calibration method and system disclosed according to an exemplary embodiment of this disclosure.

FIG. 11 shows a flowchart of how the calibration technique can be implemented in a marking engine where a linear array sensor can be moved with respect to an image receiver. For a fixed drum printing device, the drum position is fixed and the linear array moves. Other printer configurations include the linear array being fixed, but it is possible to move the photoreceptor with respect to the linear array.

In step 202, the linear array sensor is initialized. The techniques to perform this initialization are not part of this disclosure and are the standard methods used in capturing images. They can consist of things like adjusting the illumination intensity and determining the gain and offset of each pixel by monitoring a dark level and a light level.

In step 204 the bare drum image is collected and in step 206 the uniformity strip profile image is captured over the same area of the drum used in step 204. The ratio of these two images can be used to remove the variation in reflectivity over the drum surfaces in step 208. Other techniques to combine these two images in a way to remove the drum structure in a way that is insensitive to drum defects and sensing noise can be used.

In step 210 the uniformity strip profiles and fiducial positions are calculated. The fiducial positions are used to map the uniformity profile from the coordinates of the linear array sensor to the coordinates of the digital image.

Repeated captures of the uniformity strip at different relative displacements between the linear array sensor and the substrate are needed to calibrate out the linear array signature. The accuracy of the calibration increases as more captures at different relative displacements are taken. The algorithm inquires at step 212 to determine if a sufficient number of captures for the required accuracy have been made. If not, then the uniformity strip and the linear array are displaced relative to each other at step 218 and steps 204-210 are repeated. If a sufficient number of captures for the required accuracy have been made, then the algorithm proceeds to step 214.

In step 214, equation (7) is used to calculate B, which contains the sensor signature and the uniformity strip profile. If the relative positions of the captures are known ahead of time, the matrix M can be calculated offline and inverted. Under these circumstances, equation (7) would consist of a matrix multiplication and a series of linear combinations of the measured profiles to get the calibrated profiles. If the relative positions are not known ahead of time, then the matrix M must be determined from the relative positions and inverted.

According to equation (4) the calibrated profile solution of equation (7) is a concatenation of the sensor signature S and the true strip profile P. If the sensor signature is stable in time, it can be measured once with the calibration technique and then supplied to subsequent captures. If the sensor signature is unstable in time, the calibration can be performed repeatedly and the true strip profile P extracted from the solution of equation (7). A separate sensor signature is potentially required for each gray level and color.

Step 216 sends the calibrated profile to the control code of the controller associated with the control of the marking engine, then the algorithm ends at step 220.

Disclosed heretofore is a method and system of calibrating an image sensor, such as a linear array sensor, where a test pattern is marked on an image receiving device, such as a drum or photoreceptor belt which is used to transport an image to a media substrate. The disclosed method and system are not limited to a particular media substrate, for example, sheet paper, continuous feed roll paper, Mylar or any other substrate capable of receiving an image by means of offset printing or direct printing.

Figure 13:
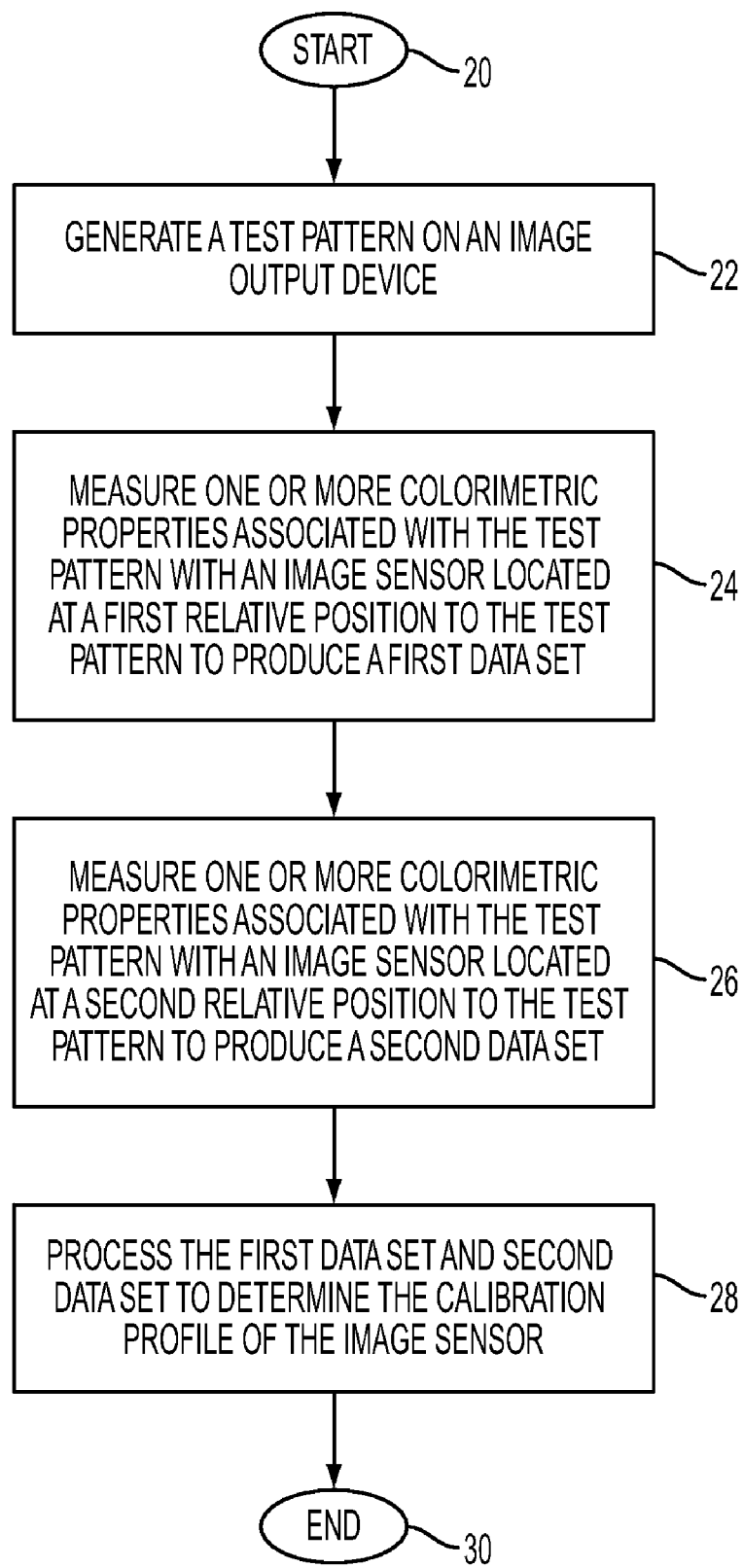
FIG. 13 is a flow chart of a method of calibrating/profiling an image sensor according to an exemplary embodiment of this disclosure.

With reference to FIGS. 12 and 13, illustrated are an exemplary system and method of calibrating an image sensor according to this disclosure.

The image output system illustrated in FIG. 12 comprises an image output device 10, an image output sensor and an image output controller 14.

Substantively, the image output controller 14 executes the necessary control code to execute the algorithms discussed heretofore. This includes communicating data to the image output device for printing on a substrate.

The image output device/image receiving device 10 receives data from the image output controller and controls the printing process to produce an image of the test patterns on a drum, photoreceptor belt, media sheet or other substrate capable of receiving the image marking material. Typical examples of acceptable marking materials include toner and ink, however this disclosure and the embodiments therein is not limited to a particular type of marking material. Notably, the image output device is functionally an image receiving device which may print an image on a substrate internal to an image output device or print an image on a substrate which is a final product of the image output device 10.

An image output sensor 12, such as a linear array sensor, captures the image(s) of the test pattern images produced by the image output device and communicates this data to the image output controller 14 for further processing.

FIG. 13 illustrates a flow chart and a method of calibrating an image sensor according to another exemplary embodiment of this disclosure. The method provides the substantive processes to determine the calibration profile of an image sensor.

Initially, the calibration method starts 20.

Then, a test pattern is generated on an image output or receiving device 22.

Next, the calibration method measures one or more calorimetric properties associated with the test pattern with an image sensor located at a first relative position to the test pattern to produce a first data set 24. The measured calorimetric properties may include, but are not limited to, toner density, ink density, etc.

Next, the calibration method measures one or more colorimetric properties associated with the test pattern with an image sensor located at a second relative position to the test pattern to produce a second data set 26.

Next, the calibration method processes the first data set and second data set to determine the calibration profile of the image sensor 28.

Finally, the calibration ends 30.

Notably, the method described with reference to FIG. 13 provides an image sensor calibration with the image sensor located at a first and second position relative to a test pattern. However, the disclosed method effectively covers a calibration method where the image sensor is located at a plurality of positions relative to a test pattern.

Figure 14:
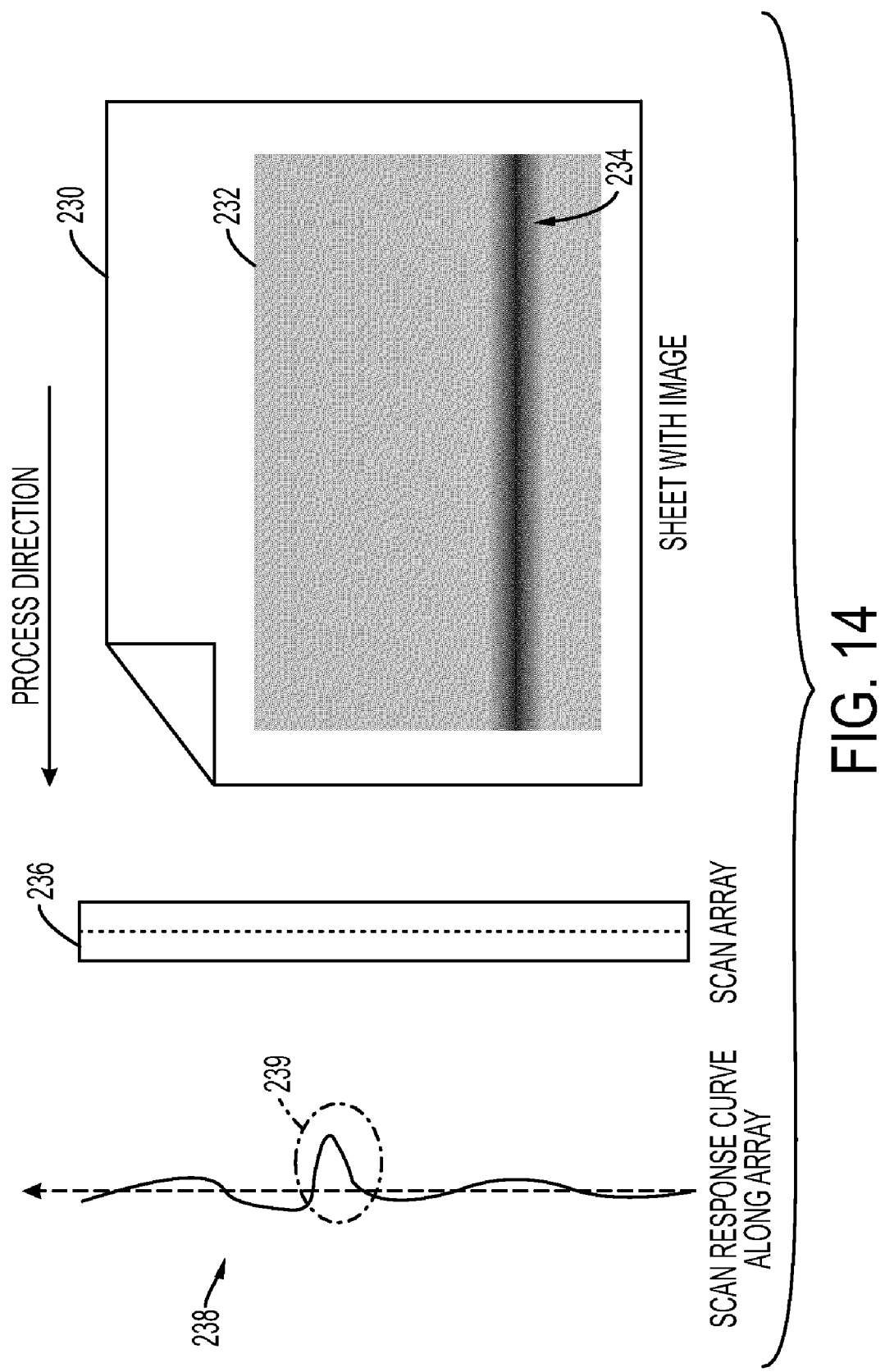
FIG. 14 illustrates an exemplary CVT (Constant Velocity Transport) type scanning system according to an embodiment of this disclosure.

With reference to FIG. 14, illustrated is another exemplary embodiment of a scanning system for executing a calibration process according to this disclosure. Specifically, the scanning system includes a media sheet 230 with a printed image 232, such as a calibration test pattern with a predetermined print density. As shown, the printed image includes a streak 234. In addition, the scanning system includes a full width scanning array 236, such as a linear array sensor. Scanner response curve 238 illustrates the uniformity profile of the scanner, where area 239 of the scanner exhibits a substantial nonuniformity.

As previously discussed within this disclosure, the scanning system shown in FIG. 14 illustrates the necessity to deconvolute an image response measured by a scanner to determine if a measured nonuniformity is produced by the scanner due to scanner nonuniformities such as area 239 or due to printer generated nonuniformities such as streak 234.

In other words, the exemplary CVT scanning system will produce a resultant signal generating a two-dimensional pixel map of the media sheet image with two sources on nonuniformity superimposed, i.e. the scanner nonuniformity 239 and the printer nonuniformity streak 234.

Figure 15:
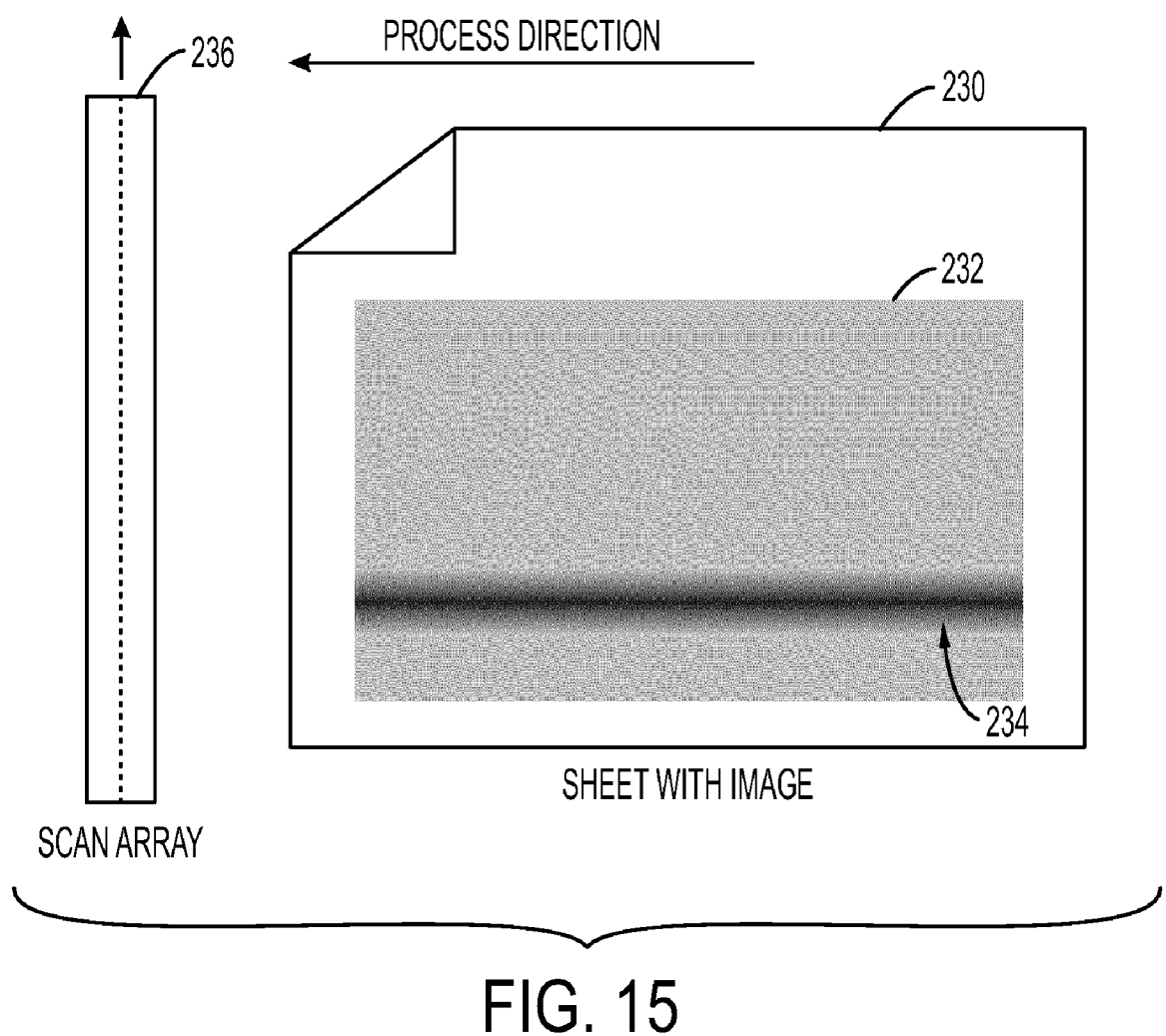
FIG. 15 illustrates an exemplary CVT type scanning system according to an embodiment of this disclosure.
Figure 16:
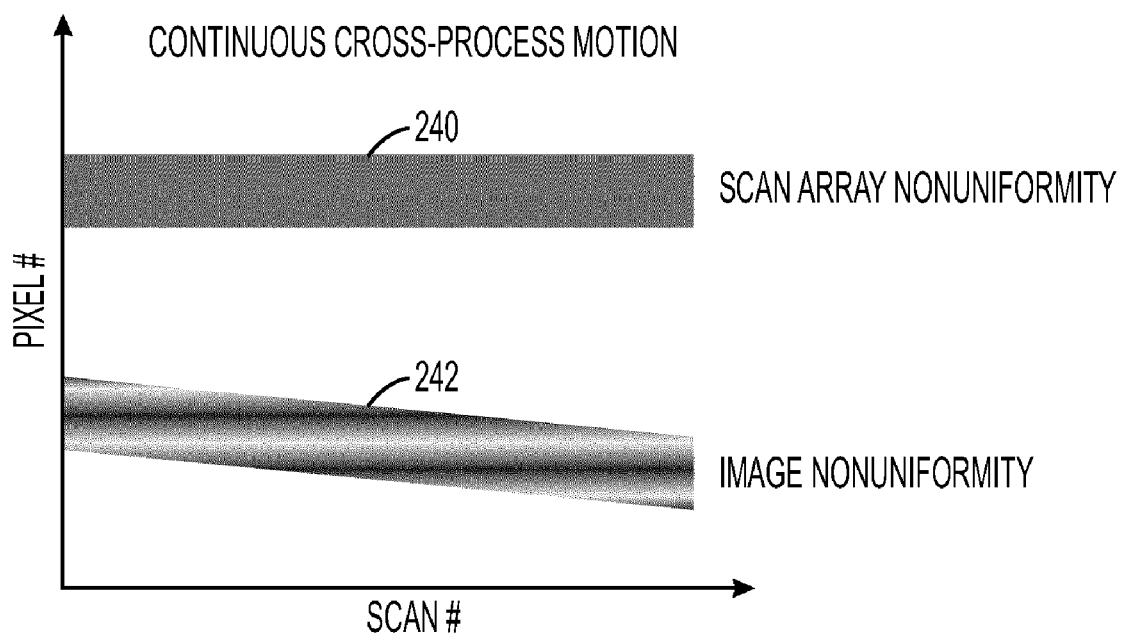
FIG. 16 illustrates a continuous CVT type scanning system according to an embodiment of this disclosure.
Figure 17:
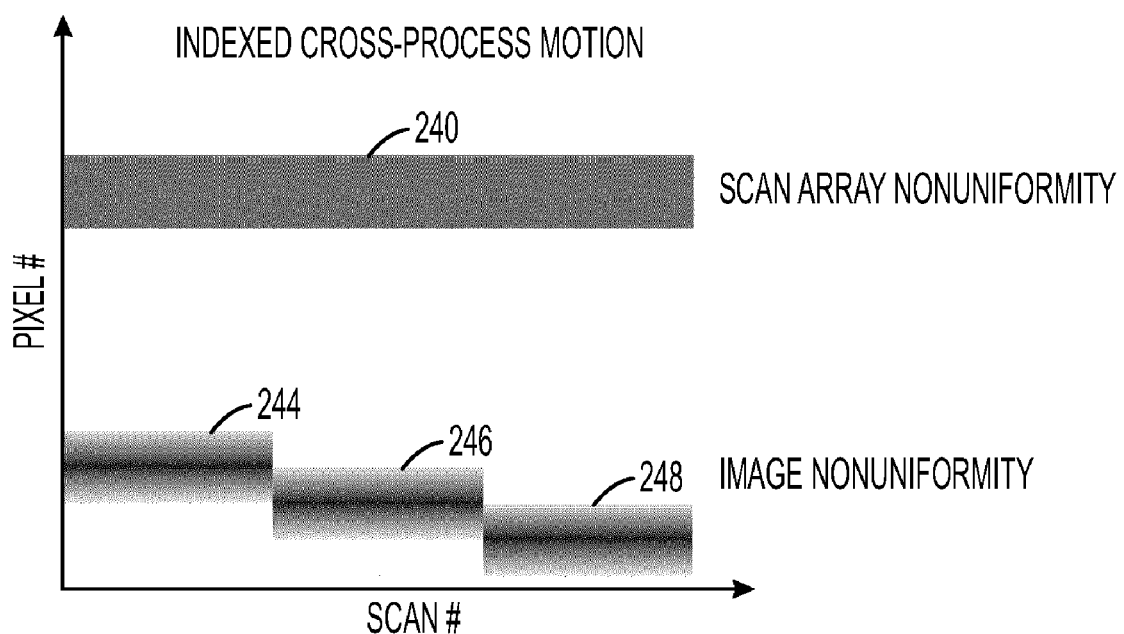
FIG. 17 illustrates an indexed CVT type scanning system according to an embodiment of this disclosure.

With reference to FIGS. 15-17, illustrated are exemplary control processes of the CVT scanning system illustrated in FIG. 14 which provide a means for deconvoluting the two sources of nonuniformities.

FIG. 15 illustrates the CVT scanning system shown in FIG. 14 with the added function of controlling the scanner array to move in a cross process direction. In operation, as a media sheet 230 travels through the CVT scan zone of the scanner array 236 in the process direction, a coordinated relative motion in the cross-process direction is performed between the CVT scanner 236 and the media sheet 230. Performance of this coordinated cross-process relative motion can be accomplished by shifting the scanner array 236 as illustrated in FIG. 15, or equivalently, by shifting the media sheet 230 relative to the scanner array 236.

With reference to FIG. 16, illustrated is an exemplary method of scanning an image utilizing the scanning arrangement illustrated in FIG. 15.

FIG. 16 illustrates a continuous cross-process motion method where the scan array 236 advances in a continuous low velocity cross-process direction. Uniformity profile 240 illustrates the nonuniformity associated with area 239 of the scanner response curve shown in FIG. 14. Uniformity profile 242 illustrates the nonuniformity associated with streak 234 associated with the printed image.

With reference to FIG. 17, illustrated is another exemplary method of scanning an image utilizing the scanning arrangement illustrated in FIG. 15.

FIG. 16 illustrates an indexed cross-process motion method where the scan array 236 indexes in the cross-process direction. Uniformity profiles 244, 246 and 248 represent the capturing of the streak 234 by the scan array 236 at three different cross-process indexed locations associated with the scan array 236.

It will be appreciated that variations of the above-disclosed and other features and functions, or alternatives thereof, may be desirably combined into many other different systems or applications. Also, that variations presently unforeseen or unanticipated alternatives, modifications, variations or improvements therein may be subsequently made by those skilled in the art which are also intended to be encompassed by the following claims.

The invention claimed is:

1. A method of calibrating an image sensor as a function of a pixel index associated with the image sensor comprising:
   generating a test pattern on an image receiving device;
   measuring one or more colorimetric properties associated with the test pattern with an image sensor located at a first position relative to the test pattern to produce a first data set, wherein the image sensor is aligned with a first area of the test pattern associated with a first range of pixel indices;
   measuring the one or more colorimetric properties associated with the test pattern with the image sensor located at a second position relative to the test pattern to produce a second data set, wherein the image sensor is aligned with a second area of the test pattern associated with a second range of pixel indices which partially overlap the first range of pixel indices; and
   processing the first data set and second data set to determine the calibration profile of the image sensor as a function of the pixel indices, wherein the first and second areas of the test pattern include a common area of the test pattern associated with the partial overlap of the first and second range of pixels.

2. The method of calibrating an image sensor according to claim 1, wherein the image receiving device comprises a print media sheet, a photoreceptor belt or a photoreceptor drum.

3. The method of calibrating an image sensor according to claim 1, wherein the image sensor comprises a linear array sensor.

4. The method of calibrating an image sensor according to claim 1, wherein the colorimetric properties measured by the image sensor comprises a toner or ink density associated with one or more colors generated on the test pattern.

5. The method of calibrating an image sensor according to claim 1, wherein the image sensor travels a predetermined distance from the image sensor first position to the image sensor second position and the test pattern position is fixed.

6. The method of calibrating an image sensor according to claim 1, wherein the test pattern is positioned at a first and second position to produce the first and second data set, respectively, and the image sensor position is fixed.

7. The method of calibrating an image sensor according to claim 1, wherein the test pattern comprises one or more strips aligned substantially perpendicular to the longitudinal orientation of the image sensor, the one or more strips ranging in color density.

8. The method of calibrating an image sensor according to claim 1, wherein the image sensor is located at three or more distinct positions relative to the test pattern to produce three or more respective data sets, and the calibration profile of the image sensor is determined by processing the three or more respective data sets.

9. The method of calibrating an image sensor according to claim 1, wherein the image receiving device is an image receiving surface associated with a printer.

10. The method of calibrating an image sensor according to claim 1, further comprising:
continuously moving the image sensor in a cross-process direction to measure the one or more colorimetric properties associated with the test pattern at the first and second positions.

11. The method of calibrating an image sensor according to claim 1, further comprising:
indexing the image sensor in a cross-process direction to measure the one or more colorimetric properties associated with the test pattern at the first and second positions.

12. An image output system comprising:
an image output device;
an image output sensor; and
an image output controller operatively connected to the image output device and image output sensor, the image controller output system configured to perform a method of calibrating the image output sensor as a function of a pixel index associated with the image output sensor, the method comprising:
measuring one or more calorimetric properties associated with a test pattern with the image output sensor at a first location relative to the test pattern and producing a first data set, wherein the image sensor is aligned with a first area of the test pattern associated with a first range of pixel indices;
measuring one or more colorimetric properties associated with the test pattern with the image sensor located at a second location relative to the test pattern and producing a second data set, wherein the image sensor is aligned with a second area of the test pattern associated with a second range of pixel indices which partially overlap the first range of pixel indices; and
processing the first data set and second data set to determine the calibration profile of the image sensor as a function of the pixel indices, wherein the first and second areas of the test pattern include a common area of the test pattern associated with the partial overlap of the first and second range of pixels.

13. The image output system according to claim 12, wherein the test pattern comprises indexing marks to correlate the first and second data sets.

14. The image output system according to claim 12, wherein the calorimetric properties measured by the image sensor comprises toner or ink density associated with one or more colors.

15. The image output system according to claim 12, wherein the image sensor travels a predetermined distance from the image sensor first location to the image sensor second location, and the test pattern position is fixed.

16. The image output system according to claim 12, wherein the test pattern is positioned at a first and second position to produce the first and second data set, respectively, and the image sensor position is fixed.

17. The image output system according to claim 12, wherein the test pattern comprises one or more strips aligned substantially perpendicular to the longitudinal orientation of the image sensor, the one or more strips ranging in color density.

18. The image output system according to claim 12, wherein the image output controller system is configured to measure one or more colorimetric properties associated with the test pattern with the image sensor located at three or more distinct positions relative to the test pattern to produce three or more respective data sets, and the calibration profile of the image sensor is determined by processing the three or more respective data sets.

* * * * *